US012113314B2

(12) United States Patent
Linseder et al.

(10) Patent No.: US 12,113,314 B2
(45) Date of Patent: Oct. 8, 2024

(54) ADAPTER PLUG WITH PLAY COMPENSATION

(71) Applicant: HIRSCHMANN AUTOMOTIVE GMBH, Rankweil/Brederis (AT)

(72) Inventors: Manuel Linseder, Rankweil (AT); Daniel Breuss, Feldkirch (AT); Michael Hofer, Sulz (AT)

(73) Assignee: HIRSCHMANN AUTOMOTIVE GMBH, Rankweil/Brederis (AT)

( * ) Notice: Subject to any disclaimer, the term of this patent is extended or adjusted under 35 U.S.C. 154(b) by 338 days.

(21) Appl. No.: 17/619,543

(22) PCT Filed: Jul. 24, 2020

(86) PCT No.: PCT/EP2020/070960
§ 371 (c)(1),
(2) Date: Dec. 15, 2021

(87) PCT Pub. No.: WO2021/018773
PCT Pub. Date: Feb. 4, 2021

(65) Prior Publication Data
US 2022/0271474 A1 Aug. 25, 2022

(30) Foreign Application Priority Data
Jul. 26, 2019 (DE) ......................... 102019120276.0

(51) Int. Cl.
*H01R 13/631* (2006.01)
*H01R 31/06* (2006.01)

(52) U.S. Cl.
CPC ......... *H01R 13/6315* (2013.01); *H01R 31/06* (2013.01)

(58) Field of Classification Search
CPC ... H01R 31/06; H01R 13/514; H01R 13/6315
USPC .................................................. 439/638, 248
See application file for complete search history.

(56) References Cited

U.S. PATENT DOCUMENTS 4,408,819 A * 10/1983 Guelden ................ H01R 24/62 379/438
4,808,115 A * 2/1989 Norton ............... H01R 13/6315 439/271
4,909,748 A * 3/1990 Kozono ............. H01R 13/6315 439/247
5,329,262 A * 7/1994 Fisher, Jr. .............. H01R 24/44 333/260

(Continued)

FOREIGN PATENT DOCUMENTS

DE 102016004170 A 10/2016
DE 102017115913 A1 * 1/2018 ........... H01R 13/436
FR 3062956 A 8/2018

*Primary Examiner* — Marcus E Harcum
(74) *Attorney, Agent, or Firm* — Andrew Wilford

(57) ABSTRACT

Adapter (1) having two socket housings (3, 4) which are connected to one another by means of lines (12) with, for example, crimped-on contact partners (11), such as socket contacts (10) or the like, wherein the contact partners (11) are arranged in the socket housings (3, 4) and can be connected to plugs, wherein the socket housings (3, 4) are arranged in a holder (2) and wherein the plugs and/or socket housings (3, 4) are designed such that they can be displaced in a play-compensating manner in relation to the holder (2) in the X and/or Y direction transversely to the holder (2).

7 Claims, 5 Drawing Sheets

(56) References Cited

U.S. PATENT DOCUMENTS

| | | | | | |
|---|---|---|---|---|---|
| 5,516,303 | A * | 5/1996 | Yohn | H01R 13/6315 | 439/248 |
| 5,605,150 | A * | 2/1997 | Radons | H01R 13/6315 | 439/247 |
| 6,030,242 | A * | 2/2000 | Cunningham | H01R 13/6315 | 439/247 |
| 6,325,652 | B1 * | 12/2001 | Grant | H01R 13/6315 | 439/248 |
| 6,422,885 | B2 * | 7/2002 | Kain | H01R 13/6315 | 439/247 |
| 6,558,177 | B2 * | 5/2003 | Havener | H01R 24/50 | 439/246 |
| 7,090,521 | B2 * | 8/2006 | Nishio | H01R 13/6315 | 439/248 |
| 7,214,080 | B2 * | 5/2007 | Ichio | H01R 13/6272 | 439/246 |
| 7,416,413 | B2 * | 8/2008 | Liao | H01R 31/06 | 439/11 |
| 7,717,716 | B2 * | 5/2010 | Dahms | H01R 24/50 | 439/63 |
| 8,388,352 | B1 * | 3/2013 | ChongYu | H01R 35/04 | 439/11 |
| 8,550,831 | B2 * | 10/2013 | Nishijima | H01R 13/518 | 439/248 |
| 8,986,029 | B2 * | 3/2015 | Webb | H05K 7/14 | 439/248 |
| 9,017,087 | B1 * | 4/2015 | Rossman | H01R 13/73 | 439/248 |
| 9,116,170 | B2 * | 8/2015 | Guo | G01R 1/0416 | |
| 10,411,407 | B2 * | 9/2019 | Kato | H01R 24/60 | |
| 10,498,061 | B1 * | 12/2019 | Blasick | H01R 24/50 | |
| 10,998,742 | B2 * | 5/2021 | Yu | H02J 7/0042 | |
| 2011/0201228 | A1 * | 8/2011 | Schumacher | H01R 13/6593 | 439/527 |
| 2012/0302081 | A1 * | 11/2012 | Daugherty | H01R 13/6315 | 439/248 |
| 2014/0106623 | A1 * | 4/2014 | Wu | H01R 31/06 | 439/638 |
| 2014/0199868 | A1 * | 7/2014 | Okamoto | H01R 13/6315 | 439/247 |
| 2016/0164233 | A1 * | 6/2016 | Zhu | H01R 24/50 | 439/248 |
| 2017/0257980 | A1 * | 9/2017 | Fukunaga | F16L 37/40 | |

* cited by examiner

ADAPTER PLUG WITH PLAY COMPENSATION

CROSS REFERENCE TO RELATED APPLICATIONS

This application is the US-national stage of PCT application PCT/EP2020/070960 filed 24 Jul. 2020 and claiming the priority of German patent application 102019120276.0 itself filed 26 Jul. 2019.

FIELD OF THE INVENTION

The invention relates to an adapter plug having two sockets connected to one another by conductors having, for example, crimped female contacts or the like, where the contacts are in the sockets and can be connected to external plugs.

BACKGROUND OF THE INVENTION

DE 10 2016 004 170 describes a plug-in connection with play compensation, in which a plug part with play-compensating attachment is mounted on a base part. This design is individual parts fastened to one another but not forming a closed structural unit that could easily be installed in an opening of a housing.

OBJECT OF THE INVENTION

The object of the invention is to eliminate this disadvantage and to provide a compact adapter unit.

SUMMARY OF THE INVENTION

The object of the invention is attained in that the sockets are in a holder, and in that the plugs and/or sockets are formed to be play-compensating with respect to the holder in the X- and/or Y-directions transversely to the holder.

In order to compensate for play in the Y-direction, the sockets have latching lugs engaging into respective latch apertures in the holder, and the latch apertures are larger in the Y-direction than the latching lugs. In order to achieve the required play compensation, the latch apertures in the holder are formed such that the socket can move parallel to the Y-direction (see definition of the axis system in FIG. 19) by ∀ 0.7 mm (can vary by 5% or 10% or 15% or 20%), i.e. float. The floating bearing in the Y-direction is shown as play compensation in the Y-direction in FIGS. 20 to 22.

In order to compensate for play in the X-direction, contacts formed as pins in the sockets and/or the plug are narrower than the width of the associated female contacts on the plug and/or the sockets. The play compensation in the X-direction could be solved in a similar manner as the design in the Y-direction. However, this would have the disadvantage that the sockets would then also have to be displaced in the X-direction by the predetermined play compensation value in the holder. Since this space is often not present, the inventive approach was chosen to engage into box contacts with pin contacts/pins (for example in the width of 4.8 mm), provided in principle for a larger pin width (for example a pin width to 6.3 mm). In this way, an offset of the pins or pin contacts of approximately 10% relative to the larger pin width (for example ∀ 0.6 mm) can be accommodated in the X-direction.

In a further development of the invention, the conductors extended along arcs in the holder. In this case, depending on the tolerance position of the conductor length and the housing dimensions, the flexible conductors are deformed into an arc. In the extreme case (shortest possible cutting length combined with maximum housing dimension), the arc in the conductor is in each case greater than 0, so that no tension is produced on the locking of the contacts. It is also conceivable for the conductors to be inserted either before and/or after assembly into the socket of the flange or by a device (preferably automated) in a meandering manner in order to facilitate the assembly process in the holders.

In a further development of the invention, the holder is of U-section and has retaining clips distributed over its outer surface that fix the holder in the opening of a housing. In order to ensure a firm fit of the adapter plug in the housing of an electronic device, retaining clips are provided on three sides that clamp the holder in the housing without play. As a result of the pressure load on the holder frames, the U-shaped holder is slightly compressed in the X-direction, which in turn would be disadvantageous for the clearance of the sockets in the Y-direction. Reinforcement of the holder is not possible in this region, since space must be available for receiving the conductors. Decoupling slots have therefore been installed between the regions of the retaining clips and the regions of the latch apertures or recesses of the latches. This prevents the sockets floating in the Y-direction from being fixed by deformation of the holder and thus being impeded in their function.

Projecting mounting ears that can be fastened to the housing by screw eyelets are attached to the holder. Furthermore, at least one latching wedge is provided at a spacing from the mounting ears, this latching wedge clamping the holder in the opposite direction to the mounting ears on a shoulder of the housing such that axial fixing of the adapter plug is provided in both directions. When inserted in a groove-like recess, the locking wedge can also serve as a rotation-inhibiting lock of the holder in the housing.

BRIEF DESCRIPTION OF THE DRAWING

Embodiments of the invention are shown in simplified form in the drawings in which.

DETAILED DESCRIPTION OF THE PREFERRED EMBODIMENTS

Figures 1, 2, 3, 4, 5, 6, 7, 8:
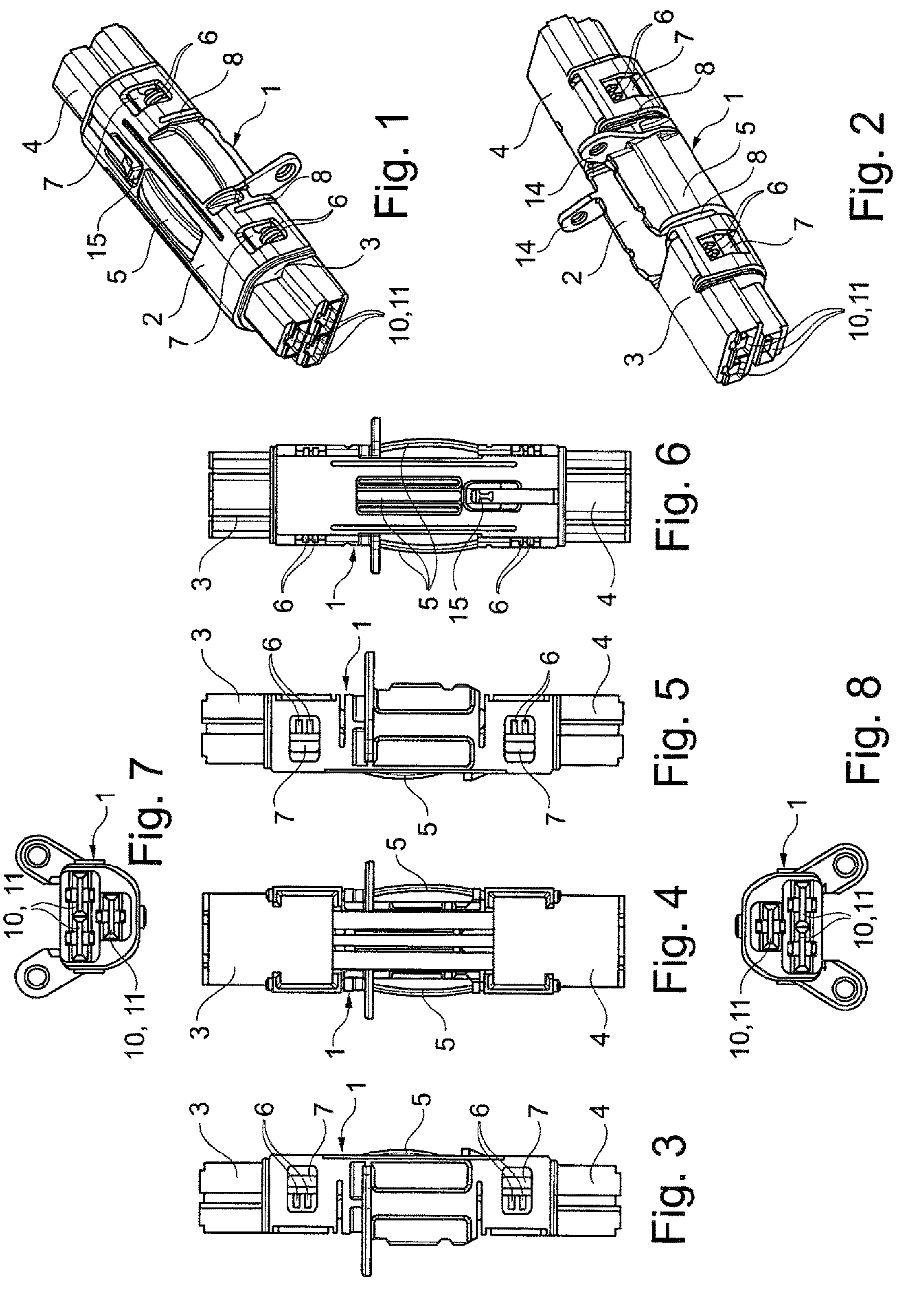
FIGS. 1 and 2 are perspective views of the adapter plug in opposite directions.
FIGS. 3 to 8 are external views of the adapter plug.
Figure 11:
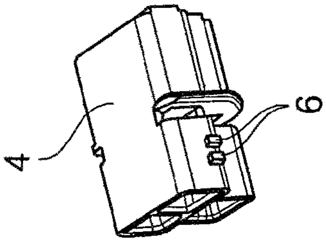
FIGS. 9 to 12 are exploded views individual parts of an adapter plug.
Figure 9:
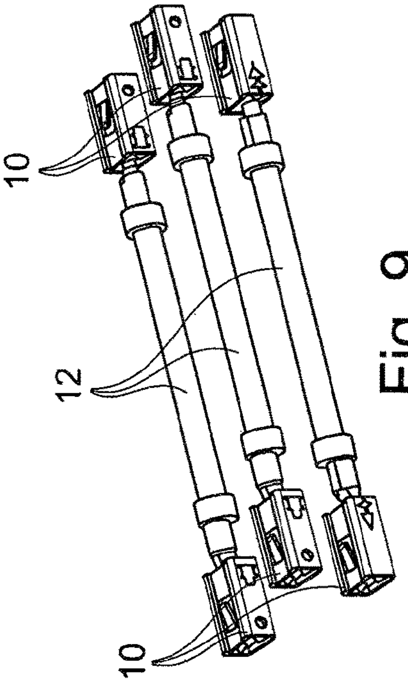
Figure 12:
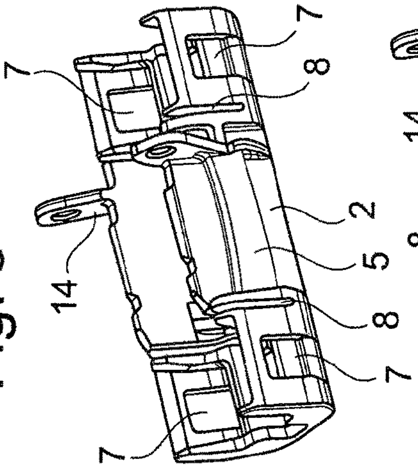
Figure 14:
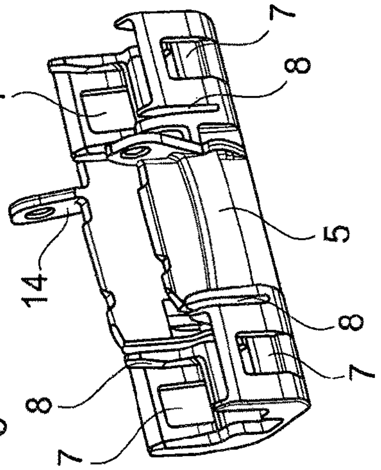
FIGS. 13 and 14 show a socket and a holder.
Figure 10:
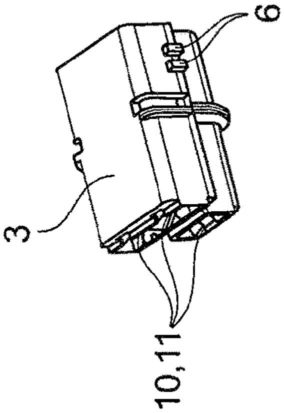
Figure 13:
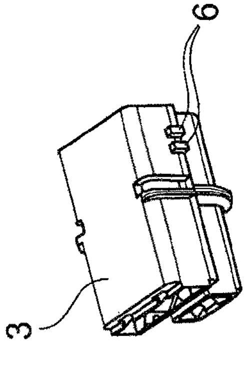
Figure 15:
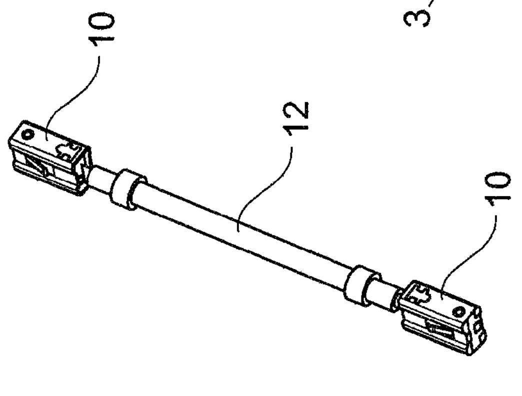
FIGS. 15 to 18 illustrate an assembly sequence of an adapter plug beginning with a conductor and female contacts, a plurality of conductors having female contacts and a socket, then the assembly of both sockets and finally the mounting of the holder.
Figure 16:
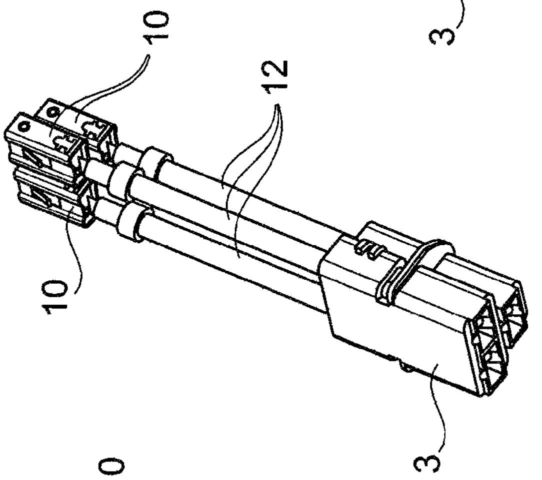
Figure 17:
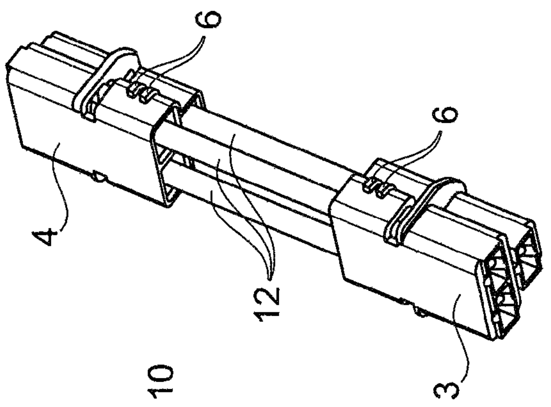
Figure 18:
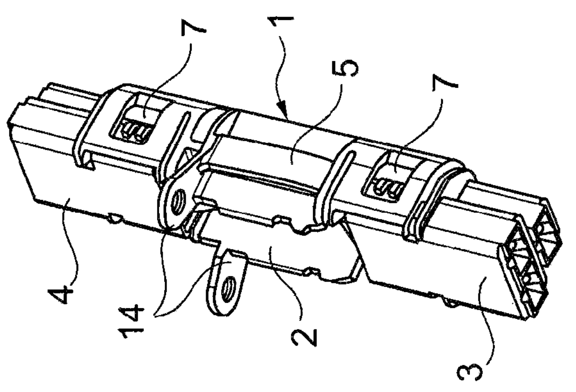

In FIGS. 1 to 33, the reference numeral 1 designates an adapter plug that has a holder 2 in whose ends sockets 3 and 4 are installed. The holder is U-shaped and is provided with holder clips 5 that project elastically from the holder 2. They serve to fix the adapter plug 1 in the opening of a housing 13. The sockets 3 and 4 have latch formations 6 that fit with respective latch apertures 7 in the holder 2. Because the latch apertures 7 are larger in the Y-direction (see FIG. 19) than the latching lugs and the sockets 3 and 4 in the holder 2 have a certain play, the sockets 3 and 4 can move in the Y-direction.

Angularly extending decoupling slots 8 are formed between the region of the retaining clip 5 and the adjoining end regions holding the sockets 3 and 4. They prevent deformation in the region of the sockets 3 and 4 of the holder 2 due to the radial pressure of the retaining clips 5, so that they can continue to move freely in the Y-direction. The extent of the movement possibilities of the sockets 3 and 4 in the holder 2 in the Y-direction are shown in FIGS. 20 to 22.

Figures 19, 20, 21, 22, 23, 24, 25, 26, 27, 28:
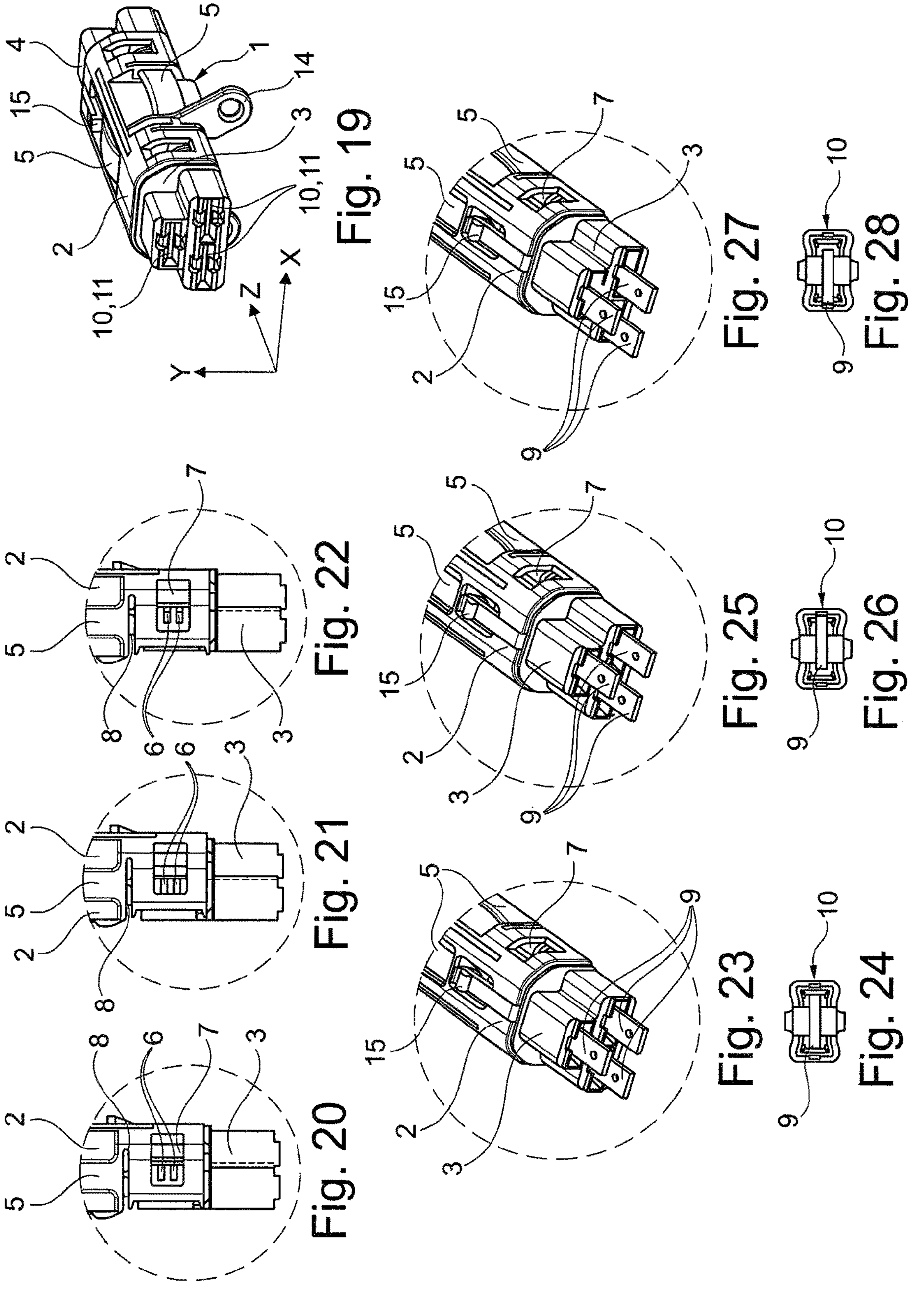
FIG. 19 is an illustration of the axle system used in the application in conjunction with the adapter plug.
FIGS. 20 to 22 show the positions of a socket within the holder in Y-direction.
FIGS. 23 to 28 show the displacement of pins or pin contacts in the X-direction with widened female contacts.

The possibilities of movement in the X-direction are shown in FIGS. 23 to 28. Pins 9 in the sockets 3 and/or 4 are considerably narrower than the female contacts associated with the width in a plug part (not shown). The position of the pins 9 in the female contacts designated by 10 is shown in FIGS. 24, 26 and 28.

Conductors 12 crimped for example to the contacts 11 fixed in the sockets 3 and 4 extend between these contacts 11. As shown in particular in FIGS. 30 and 31, the conductors 12 extend along arcs such that no tensile force affects the locking of the contacts.

Figure 32:
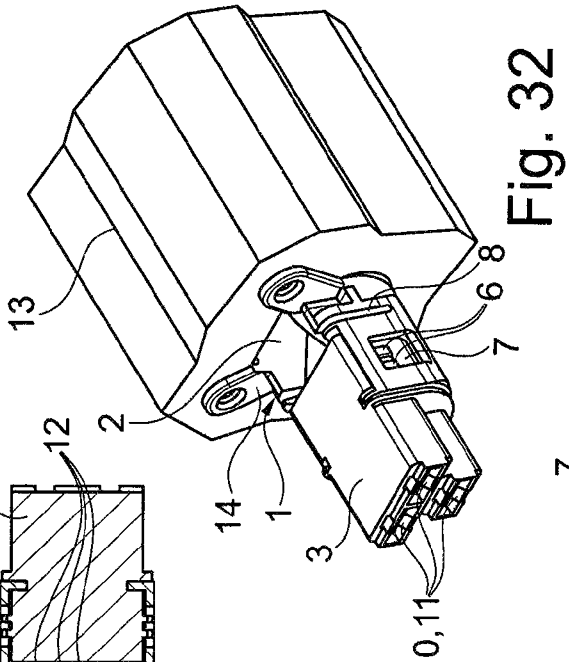
FIGS. 32 and 33 are perspective views of a housing with openings in which adapter holders are installed.
Figure 31:
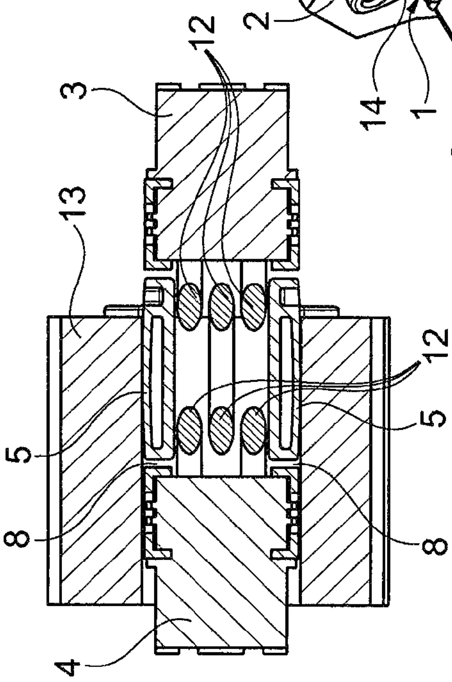
FIGS. 29 to 31 are views of an adapter plug with a section through the latter according to lines XXX and XXXI.
Figure 33:
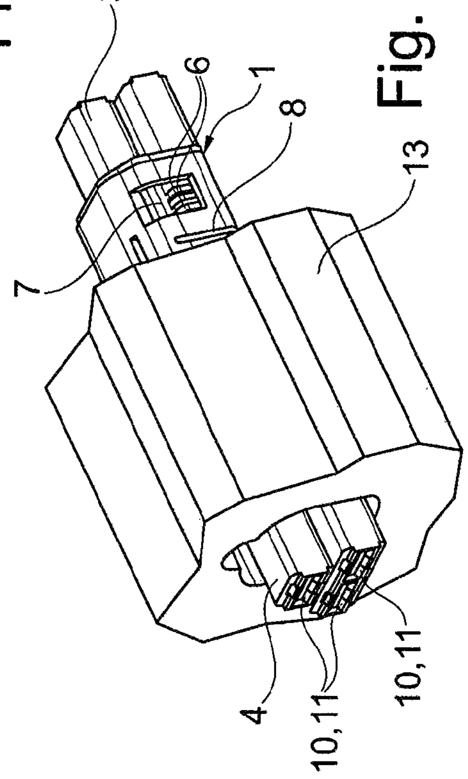
Figure 29:
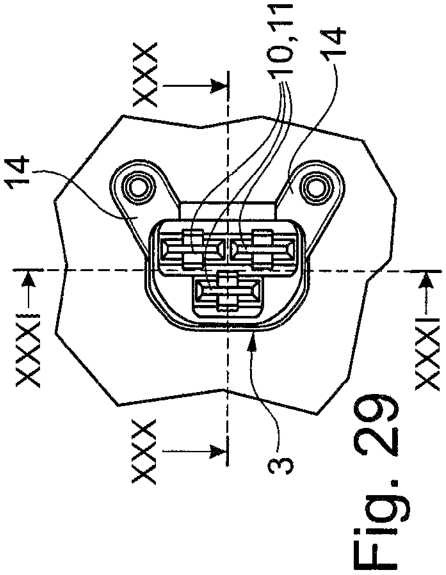
Figure 30:
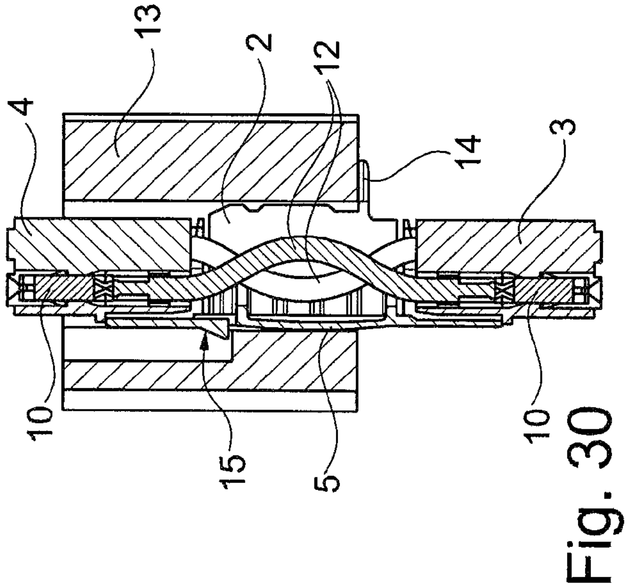

As shown in FIGS. 32 and 33, the adapter plug 1 is installed in openings in a housing 13, the dimension of the openings being such that the adapter plug 1 is exactly fixed via the retaining clip 5.

Axial fixing takes place via mounting ears 14 that can be fastened by screws in one direction. Fixing in the opposite direction takes place by a locking wedge 15 (see in particular FIG. 30) that is supported on an abutment in the housing 13. If the abutment is shaped as an axially extending groove, it serves as an antirotation lock along with the locking wedge 15.

The invention claimed is:

1. An adapter plug comprising:
 a housing having an opening;
 two sockets;
 conductors for connecting together the sockets, having contacts in recesses of the sockets, and connectable to external plugs;
 a U-section holder containing the sockets;
 retaining clips on the holder, spaced around the opening, and fixing the holder in the opening of the housing, the plugs and/or sockets being displaceable relative to the holder in the X- and/or Y-direction transversely to the holder in a play-compensating manner; and
 angularly extending decoupling slots between the holder clips and the recesses of the sockets in the holder.

2. The adapter plug according to claim 1, wherein the sockets have latching lugs engaging into respective latch apertures in the holder, and the latch apertures are larger in the Y-direction than the latching lugs in order to compensate for play in the Y-direction.

3. The adapter plug according to claim 1, wherein, for play compensation in the X-direction, contacts formed as pins are formed narrower in at least one socket and/or on the plugs than the width of associated female contacts on the plugs and/or on at least one of the sockets.

4. The adapter plug according to claim 1, wherein the conductors extended along arcs in the holder.

5. The adapter plug according to claim 1, wherein at least one projecting mounting ear and at least one latching wedge are provided on the holder in order to axially fix the adapter plug in a housing and can be brought into operative connection with an abutment on the housing.

6. In combination with a housing having an opening, an adapter comprising:
 a generally tubular holder fitting snugly in the opening, extending along a Z-axis, and having axially oppositely open ends;
 respective sockets each in a respective one of the ends;
 respective axially contacts fixed in each of the sockets;
 interengaging formations on the holder and the sockets preventing axial movement of the sockets in the holder while permitting transverse X- and Y-movement of the sockets and their contacts in the holder; and
 respective flexible and nonstraight conductors each connected to and extending axially between a respective one of the contacts of one of the sockets and a respective one of the contacts of the other of the sockets.

7. The combination according to claim 6, wherein the formations include a pair of diametrally opposite and radially outwardly projecting lugs on each of the sockets and a complementary respective radially inwardly open apertures receiving the lugs and each of a dimension in a transverse X- or Y-direction greater than a dimension in the transverse X- or Y-direction of the respective lug, whereby each lug can move transversely in the respective aperture.

* * * * *